United States Patent
Chen et al.

(10) Patent No.: US 9,876,552 B2
(45) Date of Patent: Jan. 23, 2018

(54) BEAMFORMING TECHNIQUES FOR SINGLE-STREAM COMMUNICATIONS

(71) Applicant: QUALCOMM Incorporated, San Diego, CA (US)

(72) Inventors: Chin-Hung Chen, San Jose, CA (US); Youhan Kim, San Jose, CA (US); Albert van Zelst, Woerden (NL); Ning Zhang, Saratoga, CA (US)

(73) Assignee: Qualcomm Incorporated, San Diego, CA (US)

( * ) Notice: Subject to any disclaimer, the term of this patent is extended or adjusted under 35 U.S.C. 154(b) by 110 days.

(21) Appl. No.: 15/012,427

(22) Filed: Feb. 1, 2016

(65) Prior Publication Data

US 2017/0222706 A1 Aug. 3, 2017

(51) Int. Cl.
| | |
|---|---|
| *H04B 7/06* | (2006.01) |
| *H04B 17/318* | (2015.01) |
| *H04W 52/24* | (2009.01) |
| *H04W 84/12* | (2009.01) |
| *H04L 25/02* | (2006.01) |

(52) U.S. Cl.
CPC ......... *H04B 7/0626* (2013.01); *H04B 7/0617* (2013.01); *H04B 17/318* (2015.01); *H04W 52/241* (2013.01); *H04L 25/0204* (2013.01); *H04L 25/0228* (2013.01); *H04W 84/12* (2013.01)

(58) Field of Classification Search
CPC ............ H04L 25/0204; H04L 25/0228; H04B 7/0626; H04B 7/0617; H04B 17/318; H04W 52/241; H04W 84/12

USPC .......................................................... 370/329
See application file for complete search history.

(56) References Cited

U.S. PATENT DOCUMENTS

| | | | |
|---|---|---|---|
| 7,966,043 B2 | 6/2011 | Guo et al. | |
| 9,054,924 B2 | 6/2015 | Kwak et al. | |
| 2011/0274002 A1* | 11/2011 | Pare, Jr. ............... | H04B 7/0452 370/252 |
| 2011/0274003 A1* | 11/2011 | Pare, Jr. ............... | H04B 7/0452 370/252 |

(Continued)

FOREIGN PATENT DOCUMENTS

WO  WO-2013005214 A1  1/2013

OTHER PUBLICATIONS

International Search Report and Written Opinion—PCT/US2016/065804—ISA/EPO—dated Mar. 7, 2017.

(Continued)

*Primary Examiner* — Stephen J Clawson
(74) *Attorney, Agent, or Firm* — Paradice and Li LLP/Qualcomm

(57) ABSTRACT

A method of adjusting single-stream transmissions by a wireless device based on channel state information (CSI). The wireless device generates a sounding packet formatted for transmission via multiple spatial streams, and transmits the sounding packet to a receiving device via a single one of the multiple spatial streams. For example, the wireless device may be a single-antenna device. The wireless device further receives channel state information (CSI) from the receiving device based at least in part on the sounding packet. The wireless device then adjusts one or more characteristics of single-stream transmissions to the receiving device based at least in part on the received CSI.

30 Claims, 11 Drawing Sheets

(56) References Cited

U.S. PATENT DOCUMENTS

| | | | |
|---|---|---|---|
| 2012/0026909 A1* | 2/2012 | Seok | H04B 7/0417 370/252 |
| 2012/0177018 A1* | 7/2012 | Abraham | H04L 1/0027 370/338 |
| 2012/0275376 A1* | 11/2012 | Sampath | H04B 7/0632 370/328 |
| 2012/0300874 A1* | 11/2012 | Zhang | H04L 5/0048 375/295 |
| 2015/0071366 A1 | 3/2015 | Nabar et al. | |
| 2015/0237513 A1 | 8/2015 | Garrett et al. | |
| 2015/0319747 A1 | 11/2015 | Chu et al. | |

OTHER PUBLICATIONS

Oh J., et al., "Performance Analysis for Channel Sounding in IEEE 802.11ac Network," IEEE International Conference on Information and Communication Technology Convergence (ICTC), 2015, pp. 1240-1242.

* cited by examiner

BEAMFORMING TECHNIQUES FOR SINGLE-STREAM COMMUNICATIONS

TECHNICAL FIELD

The present embodiments relate generally to wireless communications systems, and specifically to methods of improving single-stream communications using beamforming techniques.

BACKGROUND OF RELATED ART

Transmit beamforming is a technique for improving wireless communications between a transmitting (TX) device and a receiving (RX) device by leveraging known properties of the wireless channel (e.g., channel state information (CSI)). In conventional beamforming, the TX device utilizes multiple antennas to focus energy (e.g., data signals) toward the RX device. For example, each of the antennas of the TX device may transmit the same wireless signal with different phase offsets to "steer" the signal in the direction of the RX device (e.g., as determined from the CSI). Beamformed signals converge (e.g., combine) along the steered path and interfere with (e.g., cancel) one another outside of the steered path. Thus, the effectiveness of beamforming may depend on the accuracy of the CSI.

The IEEE 802.11ac standards describe an explicit "sounding" technique that may be performed by a TX device to acquire CSI. The TX device transmits a "sounding packet" (e.g., a null data packet (NDP)) to an RX device to elicit a channel measurement. Upon receiving the sounding packet, the RX device generates a channel estimate for the wireless channel based on training data included with the sounding packet. The RX device then feeds back the channel estimate (e.g., CSI) to the TX device. Because beamforming techniques typically require multiple antennas to implement, the IEEE 802.11ac standards describe the sounding protocol in the context of multiple spatial streams. More specifically, the sounding packet defined by the IEEE 802.11ac standards is formatted for transmission via two or more spatial streams.

Single-antenna TX devices may be incapable of transmitting via multiple spatial channels (e.g., due to lack of antenna diversity). As a result, conventional single-antenna TX devices may be unable to take advantage of existing beamforming techniques.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method of adjusting single-stream transmissions by a wireless device based on channel state information (CSI) is disclosed. The wireless device generates a sounding packet formatted for transmission via multiple spatial streams, and transmits the sounding packet to a receiving device via one of the multiple spatial streams. For example, the wireless device may be a single-antenna device. The wireless device receives, from the receiving device, CSI based at least in part on the sounding packet. The wireless device then adjusts one or more characteristics of single-stream transmissions to the receiving device based at least in part on the received CSI.

In example embodiments, the sounding packet may be formatted in accordance with an IEEE 802.11 beamforming protocol. For example, the sounding packet may be a very high throughput (VHT) null data packet (NDP). In some instances, a Signal A (VHT-SIG-A) field of the VHT NDP may indicate two or more spatial streams. Accordingly, the sounding packet may cause the receiving device to estimate and/or measure the wireless channel and generate a feedback matrix (V) based on the channel estimation. For some embodiments, the received CSI may correspond with a single column of the feedback matrix (V) generated by the receiving device. For example, the wireless device may request, from the receiving device, only the single column of the feedback matrix that corresponds with the single spatial stream.

For some embodiments, the wireless device may redistribute a power load for the single-stream transmissions on a per-tone loading basis. In some aspects, the wireless device may identify one or more subcarriers having a signal-to-interference-plus-noise ratio (SINR) above a threshold level based on the received CSI, and may reduce the per-tone power loading of the one or more identified subcarriers. In other aspects, the wireless device may identify one or more subcarriers having an SINR below a threshold level based on the received CSI, and may increase the per-tone power loading of the one or more identified subcarriers.

The methods of operation disclosed herein may allow a transmitting device to improve the quality and/or performance of single-stream transmissions to a receiving device using channel state information (CSI) pertaining to the wireless channel. More specifically, the embodiments herein may allow the transmitting device (e.g., a single-chain device) to leverage existing beamforming and/or sounding techniques (e.g., that typically require multiple transmit chains) to acquire CSI for a single-stream channel. Based on the CSI, the transmitting device may redistribute or balance a transmit power load among individual subcarriers (e.g., per-tone power loading) to improve the overall quality and/or efficiency of single-stream transmissions to the receiving device.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

Figure 1:
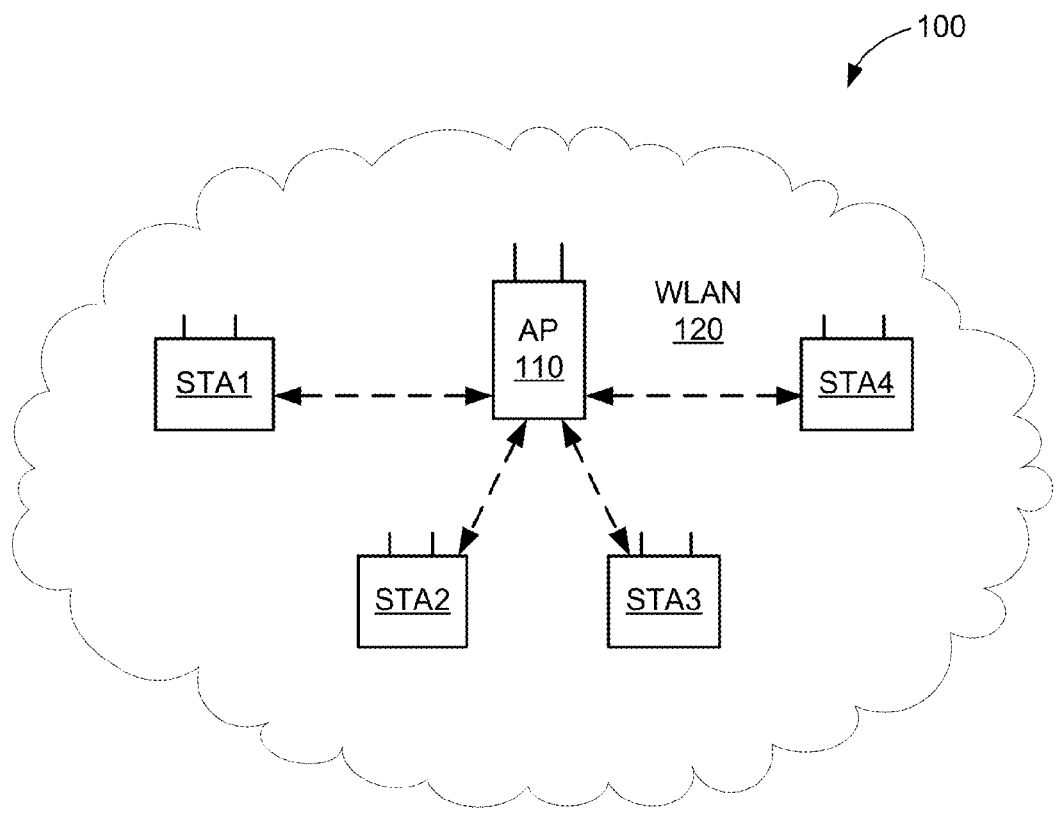
FIG. 1 shows an example wireless system within which the example embodiments may be implemented.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, BLUETOOTH® (Bluetooth), HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein.

In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. Further, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. The term "transmitting device" or "TX device" refers to any device capable of transmitting (and receiving) wireless signals. The term "receiving device" or "RX device" refers to any device capable of receiving (and transmitting) wireless signals. A "single-stream transmission" or "single-stream communication" refers to any wireless signals that are transmitted over a single spatial stream. Similarly, a "multi-stream transmission" or "multi-stream communication" refers to any wireless signals that are transmitted over multiple spatial streams.

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique media access control (MAC) address that is programmed therein by, for example, the manufacturer of the access point. Similarly, each of stations STA1-STA4 is also assigned a unique MAC address. For some embodiments, the wireless system 100 may correspond to a multiple-input multiple-output (MIMO) wireless network, and may support single-user MIMO (SU-MIMO) and multi-user (MU-MIMO) communications. Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. The AP 110 may also be any suitable wireless device (e.g., such as a wireless station) acting as a software-enabled access point ("SoftAP"). For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 9-10.

Each of the stations STA1-STA4 may be any suitable Wi-Fi enabled wireless device including, for example, a cell phone, personal digital assistant (PDA), tablet device, laptop computer, or the like. Each station may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Each of the stations STA1-STA4 is also assigned a unique MAC address. For at least some embodiments, each station may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that store instructions for performing operations described below with respect to FIGS. 9-10.

For the AP 110 and/or stations STA1-STA4, the one or more transceivers may include Wi-Fi transceivers, Bluetooth transceivers, NFC transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate with a 2.4 GHz frequency band and/or within a 5 GHz frequency band in accordance with the IEEE 802.11 standards. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communication protocol). In other embodiments, the transceivers may be any technically feasible transceiver such as a ZigBee transceiver described by the ZigBee specification, WiGig transceiver, and/or a HomePlug transceiver described in one or more standards provided by the HomePlug Alliance.

Figure 2:
FIG. 2 shows a wireless communication system in accordance with example embodiments.

FIG. 2 shows a wireless communication system 200 in accordance with example embodiments. The system 200 includes a transmitting (TX) device 210, a receiving (RX) device 230, and a wireless channel (H) 220. In some aspects, the TX device 210 may be an embodiment of the AP 110 and the RX device 230 may be an embodiment of one of the wireless stations STA1-STA4 of FIG. 1. The TX device 210 may transmit wireless signals to the RX device 230 via the wireless channel 220. The wireless channel 220 may introduce noise, delays, and/or other types of interference into the wireless signals transmitted by the TX device 210.

In example embodiments, the TX device 210 may mitigate undesirable effects of the wireless channel 220 by adjusting one or more characteristics of the transmitted signals based on one or more properties of the wireless channel 220. The TX device 210 may determine the one or more properties of the wireless channel 220 using an explicit sounding technique. For example, the TX device 210 may initiate a sounding operation by transmitting a sounding packet 202 to the RX device 230. The sounding packet 202 may contain training data that can be used by the RX device 230 to measure or otherwise estimate the properties of the wireless channel 220. The RX device 230 may respond to the sounding packet 202 by feeding back the channel estimate ($H_{est}$), as channel state information (CSI) 204, to the TX device 210. Based on the CSI 204, the TX device 210 may determine the effects of the wireless channel 220 on wireless signals transmitted to the RX device 230. Accordingly, the TX device 210 may adjust one or more characteristics (e.g., a power loading scheme) of the transmitted signals to improve the quality and/or efficiency of subsequent transmissions to the RX device 230 (e.g., via the wireless channel 220).

For some embodiments, the RX device 230 may be configured for MIMO communications (e.g., as defined by the IEEE 802.11ac standards). For example, the RX device 230 may be capable of receiving (and transmitting) wireless signals via multiple spatial streams. More specifically, the RX device 230 may implement one or more beamforming techniques described by the IEEE 802.11ac standards (e.g., for determining and/or feeding back the CSI 204). On the other hand, the TX device 210 may be configured for single-stream communications with the RX device 230. For example, the TX device 210 may be a single-antenna device. Alternatively, the TX device 210 may be multi-antenna device that uses only one of its antennas for transmitting wireless signals to the RX device 230.

The example embodiments recognize that the implementation of conventional beamforming techniques may require multiple spatial streams. For example, the IEEE 802.11ac standards describe an explicit sounding operation (e.g., for acquiring CSI from an RX device) that may be initiated by transmitting a very high throughput (VHT) null data packet (NDP) to the RX device. However, the IEEE 802.11ac standards define the VHT NDP as a multi-stream data packet (e.g., to be transmitted over two or more spatial streams). Thus, a conventional single-antenna device may be unable to transmit VHT NDPs in the manner described by the IEEE 802.11ac standards.

In example embodiments, the TX device 210 may leverage existing (e.g., multi-stream) beamforming techniques to acquire CSI 204 for a single-stream wireless channel 220. For example, the TX device 210 may generate a single-antenna (SA) sounding packet 202 that is formatted for transmission via multiple spatial streams. The SA sounding packet may include training data that can be used by the RX device 230 to measure or otherwise estimate a corresponding single-stream wireless channel. As used herein, a "single-antenna sounding packet" or "SA sounding packet" may refer to a packet, frame, and/or wireless signal that is transmitted on a single spatial stream (e.g., using a single antenna). Thus, SA sounding packets may be transmitted by single-antenna and/or multi-antenna devices in accordance with the example embodiments.

Figure 3:
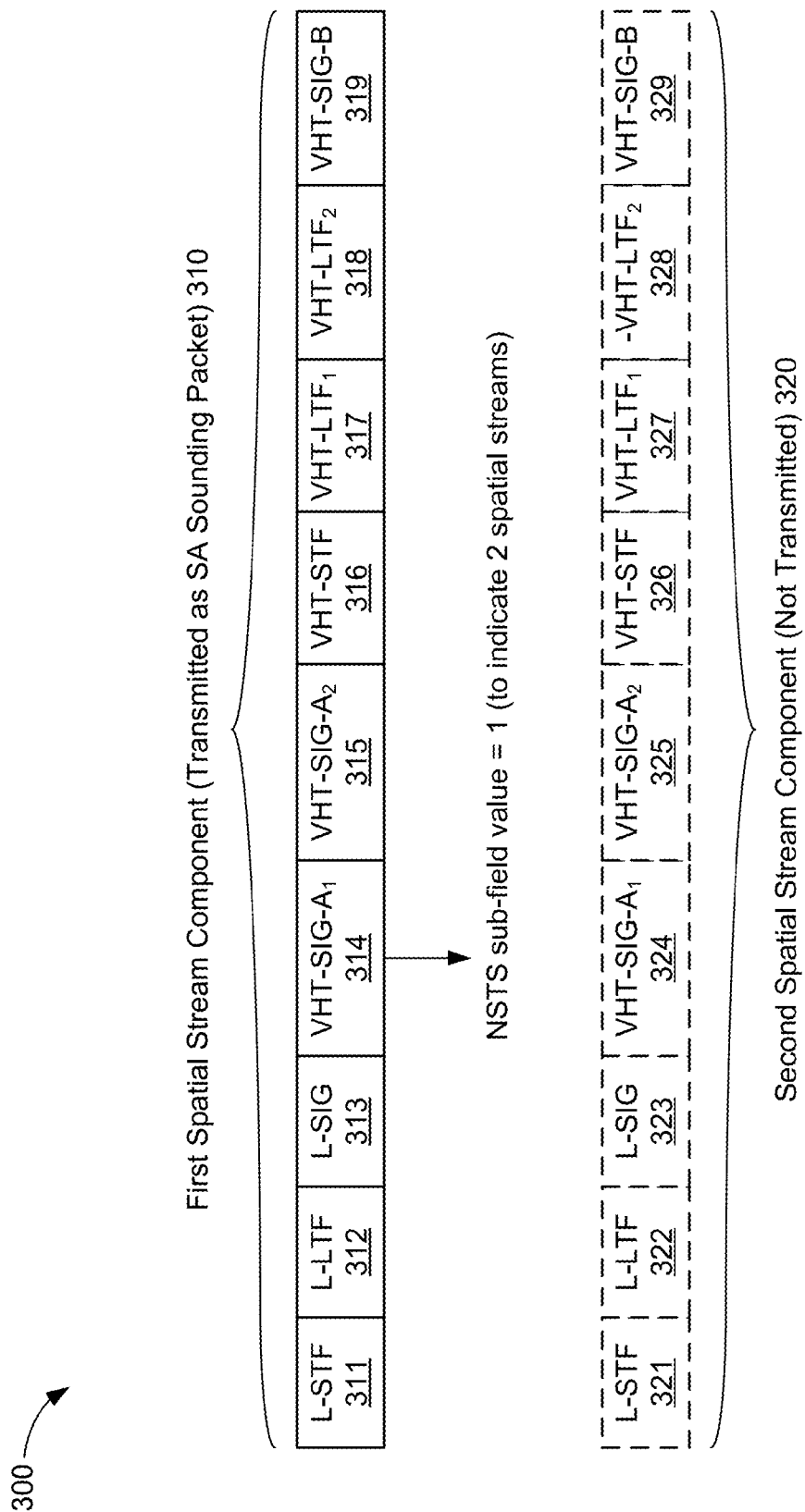
FIG. 3 shows an example structure of a single-antenna (SA) sounding packet in accordance with example embodiments.

For example, FIG. 3 shows an example structure of an SA sounding packet 300 in accordance with example embodiments. More specifically, the example SA sounding packet 300 is formatted in accordance with the IEEE 802.11ac standards (e.g., VHT NDP packet format) for transmission via two spatial streams (e.g., NSTS sub-field value=1). In other embodiments, the SA sounding packet 300 may be formatted for transmission via any number of spatial streams greater than or equal to two (e.g., NSTS sub-field value≥1). However, because the VHT NDP sounding protocol requires a minimum of two spatial streams to generate a channel estimate, the example sounding packet 300 is shown to be formatted for only two spatial streams (e.g., to reduce transmission overhead).

More specifically, the SA sounding packet 300 may include a first spatial stream component 310 and a second spatial stream component 320. The first spatial stream component 310 includes a Legacy Short Training Field (L-STF) 311, a Legacy Long Training Field (L-LTF) 312, a Legacy Signal (L-SIG) field 313, a set of VHT Signal-A (VHT-SIG-A) fields 314 and 315, a VHT Short Training Field (VHT-STF) 316, a first VHT Long Training Field (VHT-LTF$_1$) 317, a second VHT Long Training Field (VHT-LTF$_2$) 318, and a VHT Signal B (VHT-SIG-B) field 319. The VHT-SIG-A$_1$ field 314 may include a "number of spatial streams" (NSTS) sub-field to indicate the total number of spatial streams associated with the SA sounding packet 300. In the example of FIG. 3, the VHT-SIG-A$_1$ field 314 indicates that the SA sounding packet 300 is to be transmitted via two spatial streams (e.g., NSTS sub-field value=1). VHT-LTF$_1$ 317 and VHT-LTF$_2$ 318 may contain training data for the SA sounding packet 300 to estimate the channels associated with the two spatial streams.

The second spatial stream component 320 includes an L-STF 321, an L-LTF 322, an L-SIG field 323, a set of VHT-SIG-A fields 324 and 325, a VHT-STF 326, a first VHT-LTF (VHT-LTF$_1$) 327, a second VHT-LTF (-VHT-LTF$_2$) 328, and a VHT-SIG-B field 329. The second spatial stream component 320 essentially mirrors the first spatial stream component 310, except that the second spatial stream component 320 contains the opposite or inverse of the second VHT-LTF (e.g., -VHT-LTF 328).

In example embodiments, only one of the spatial stream components 310 or 320 is transmitted by a TX device as the SA sounding packet 300 to acquire CSI for a single-stream wireless channel. In the example of FIG. 3, the first spatial stream component 310 is transmitted as the SA sounding packet 300. For example, in some aspects, the TX device may generate only the first spatial stream component 310 of the SA sounding packet 300 during a single-stream sounding operation. In other aspects, the TX device may generate both spatial stream components 310 and 320 of the SA sounding packet 300 (e.g., using conventional VHT NDP generation techniques) and transmit only the first spatial stream component 310 during a single-stream sounding operation.

Referring also to FIG. 2, the SA sounding packet 300 may be transmitted by the TX device 210 on a single one of the multiple spatial streams indicated by, or otherwise associated with, the sounding packet 300. For example, the format of the SA sounding packet 300 may "spoof" or trick the RX device 230 into thinking it is receiving a multi-stream sounding packet (e.g., a VHT NDP) from the TX device 210 (e.g., in accordance with known or existing beamforming protocols). Accordingly, the example embodiments may be implemented with little or no modification to the RX device 230. For example, the RX device 230 may feedback a compressed beamforming frame (CBF) that contains information based on the channel estimate $H_{est}$ for the single-stream wireless channel 220 (e.g., as CSI 204), in response to the SA sounding packet 300, as if responding to a conventional multi-stream sounding packet (e.g., a VHT NDP).

Because the RX device 230 expects to receive two spatial streams associated with the SA sounding packet 300, the channel estimate $H_{est}$ may be representative of a two-stream channel. However, because the RX device 230 receives only one of the expected two spatial streams, the channel estimation component associated with the second spatial stream may be close to zero. Thus, while representative of a two-stream channel, the CBF returned by the RX device 230 may clearly indicate the CSI for a single-stream wireless channel (e.g., corresponding to the single spatial stream used to transmit the SA sounding packet 300).

Figure 4A:
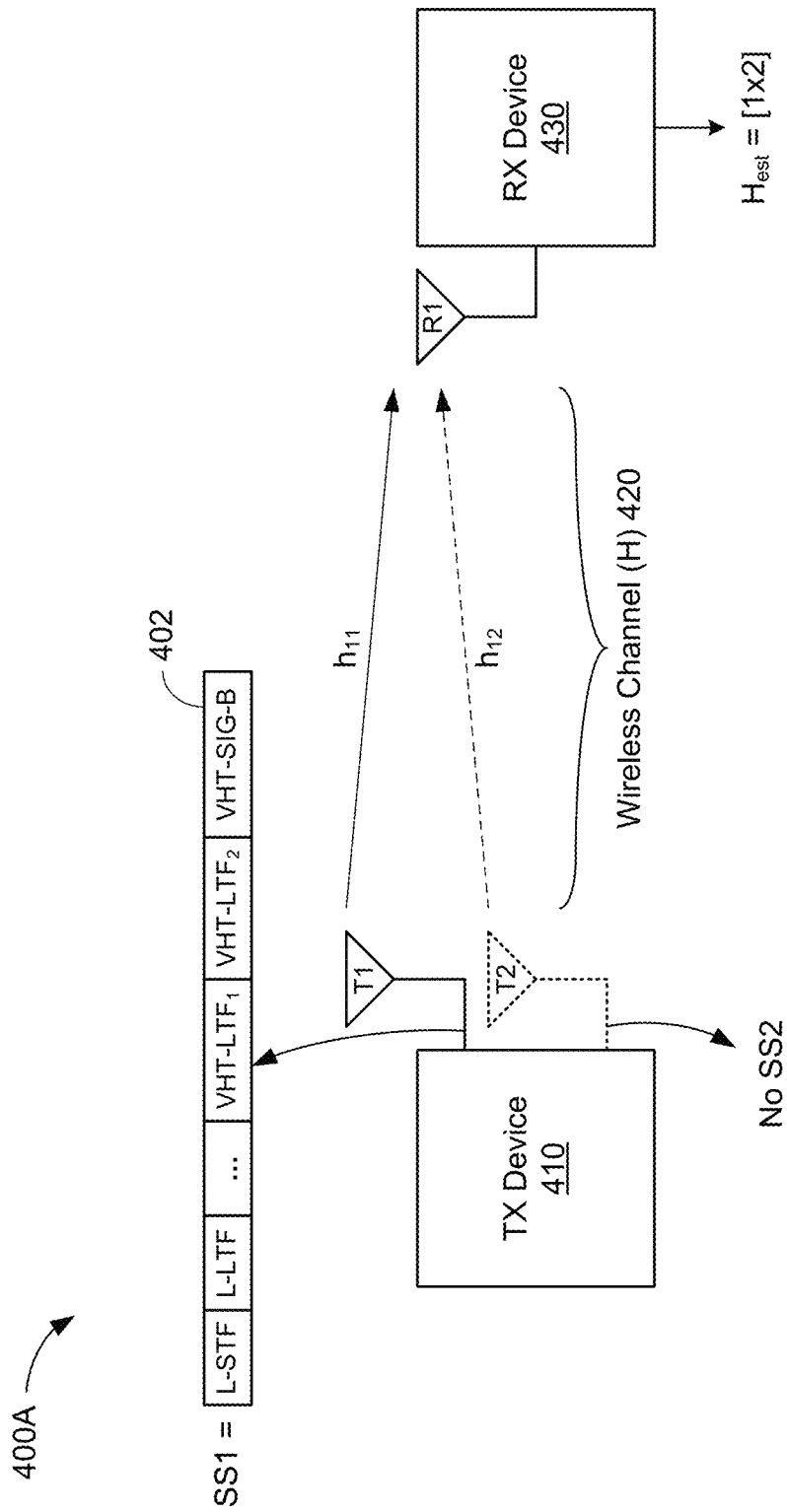
FIG. 4A depicts an example communications system wherein a transmitting (TX) device may acquire channel state information (CSI) for a single-stream wireless channel from a single-antenna receiving (RX) device.

FIG. 4A depicts an example communications system 400A wherein a TX device 410 may acquire CSI for a single-stream wireless channel 420 from a single-antenna RX device 430. The TX device 410, which may be one embodiment of the TX device 210 of FIG. 2, is shown to include a single transmit antenna T1 (although for actual embodiments, the TX device 410 may include any suitable number of antennas). The RX device 430, which may be one embodiment of RX device 230 of FIG. 2, is shown to include a single receive antenna R1 (although for actual embodiments, the RX device 430 may include any suitable number of antennas).

In example embodiments, the TX device 410 may transmit an SA sounding packet 402 via antenna T1. The SA sounding packet 402 may be an embodiment of SA sounding packet 300 of FIG. 3. As described above, the SA sounding packet 402 may be formatted for transmission via multiple (e.g., two) spatial streams. For example, through spatial multiplexing, a TX device may transmit a first portion of data on a first spatial stream (SS1) via a first antenna (e.g., antenna T1) while concurrently transmitting a second portion of data on a second spatial stream (SS2) via a second antenna (e.g., antenna T2). However, the TX device 410 of FIG. 4A may not have a second antenna T2 and/or the second antenna T2 may not be available for use. Thus, in the example embodiments, the SA sounding packet 402 is transmitted using only one of the multiple spatial streams associated therewith (e.g., the first spatial stream SS1 for the example of FIG. 4A).

The RX device 430 may receive the SA sounding packet 402 via antenna R1. Because the SA sounding packet 402 is formatted for multiple spatial streams, the RX device 430 may expect to receive a second component of the SA sounding packet 402 (e.g., on the second spatial stream SS2). Thus, the wireless channel 420, as perceived by the RX device 430, may be modeled as a 1×2 channel matrix H (e.g., or a 1×M matrix, for any number (M) of spatial streams):

$$H = [h_{11}\; h_{12}]$$

Because the SA sounding packet 402 is transmitted entirely via the first spatial stream SS1 and no data is transmitted on the second spatial stream SS2, the channel estimate $H_{est}$ may be represented as:

$$H_{est} = [h_{11}\; 0]$$

Through singular value decomposition (SVD), the channel estimate $H_{est}$ may be reduced to:

$$H_{est} = U[|h_{11}|^2\; 0]V^H$$

where $V^H$ is a compressed feedback matrix and $|h_{11}|^2$ represents the channel power associated with the first spatial stream SS1.

The RX device 430 may send a compressed beamforming frame (CBF) based on the channel estimate $H_{est}$ back to the TX device 410, for example, in accordance with the IEEE 802.11ac standards. The TX device 410 may then adjust one or more characteristics of single-stream transmissions to the RX device 430 (e.g., via the wireless channel 420) based on the received CBF. For example, the Delta-SNR information contained in CBF may reflect a per-tone channel power $(|h_{11}|^2)$ of wireless signals received at the RX device 430. Thus, as described in greater detail below, the TX device 410 may adjust a per-tone power loading of individual subcarriers to redistribute and/or balance the overall power of the transmitted signals.

Figure 4B:
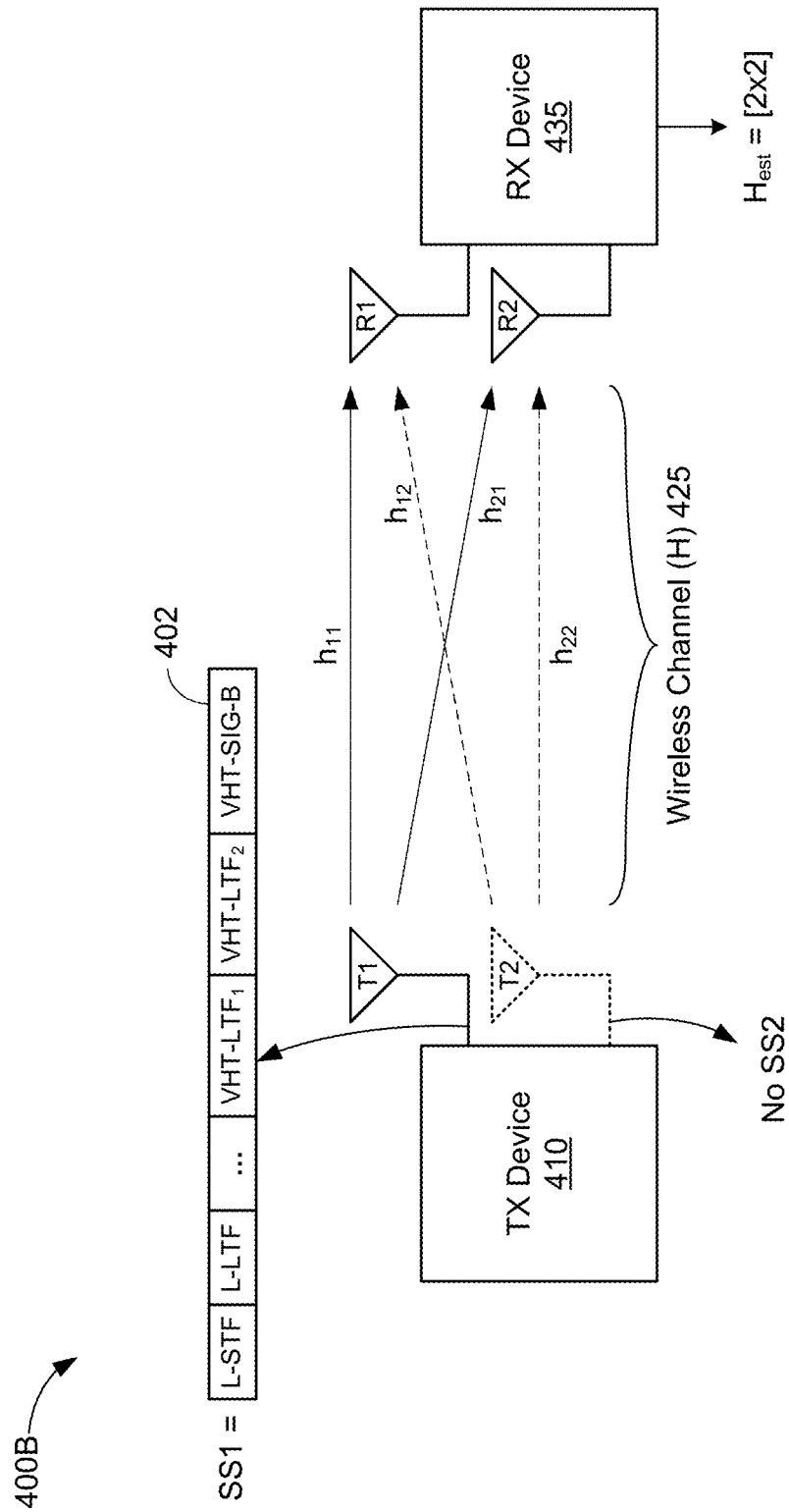
FIG. 4B depicts an example communications system wherein a TX device may acquire CSI for a single-stream wireless channel from a multi-antenna RX device.

FIG. 4B depicts an example communications system 400B wherein a TX device 410 may acquire CSI for a single-stream wireless channel 425 from a multi-antenna RX device 435. The RX device 435, which may be one embodiment of RX device 230 of FIG. 2, is shown to include multiple receive antennas R1 and R2 (although for actual embodiments, the RX device 435 may include any suitable number of antennas).

As described above with respect to FIG. 4A, the TX device 410 may transmit the SA sounding packet 402 via antenna T1 on a single spatial stream SS1. The RX device 435 may receive the SA sounding packet 402 via antennas R1 and R2. Channel conditions of the wireless channel 425 and/or spatial orientations of the receive antennas R1 and R2 may cause differences in the data patterns received by each of antennas R1 and R2. Thus, the data received by antenna R1 may differ from the data received by antenna R2.

Because the SA sounding packet 402 is formatted for multiple spatial streams, the RX device 435 may expect to receive a second component of the SA sounding packet 402 (e.g., on the second spatial stream SS2). Thus, the wireless channel 425, as perceived by the RX device 435, may be modeled as a 2×2 channel matrix H (e.g., or a 2×M matrix, for any number (M) of spatial streams):

$$H = \begin{bmatrix} h_{11} & h_{12} \\ h_{21} & h_{22} \end{bmatrix}$$

Moreover, since the SA sounding packet 402 is transmitted entirely via the first spatial stream SS1 and no data is transmitted on the second spatial stream SS2, the channel estimate Hest may be represented as:

$$H_{est} = \begin{bmatrix} h_{11} & 0 \\ h_{21} & 0 \end{bmatrix}$$

Through SVD, the channel estimate Hest may be reduced to:

$$H_{est} = U \begin{bmatrix} |h_{11}|^2 + |h_{21}|^2 & 0 \\ 0 & 0 \end{bmatrix} V^H$$

where $V^H$ is a compressed feedback matrix and Delta-SNR represents the $|h_{11}|^2 + |h_{21}|^2$ associated with the first spatial stream SS1.

The RX device 435 may send a CBF based on the channel estimate $H_{est}$ back to the TX device 410 (e.g., in accordance with the IEEE 802.11ac standards). The TX device 410 may then adjust one or more characteristics of single-stream transmissions to the RX device 435 via the wireless channel 425 based on the CBF. For example, the Delta-SNR contained in the CBF may represent a per-tone channel power of wireless signals $(|h_{11}|^2+|h_{21}|^2)$ received at the RX device 435. Thus, as described in greater detail below, the TX device 410 may adjust a per-tone power loading of individual subcarriers to redistribute and/or balance the overall power of the transmitted signals.

The example embodiments of FIGS. 4A and 4B may be expanded for any number (N) of receive antennas. For example, an RX device with N receive antennas may generate a channel estimate $H_{est}$ (assuming the SA sounding packet 402 is formatted for two spatial streams):

$$H_{est} = \begin{bmatrix} h_{11} & 0 \\ \vdots & \vdots \\ h_{N1} & 0 \end{bmatrix} = U \begin{bmatrix} |h_{11}|^2 + |h_{21}|^2 + \ldots + |h_{N1}|^2 & 0 \\ \vdots & \vdots \\ 0 & 0 \end{bmatrix} V^H$$

The feedback matrix V may include component vectors for each of the spatial streams (e.g., SS1 and SS2) associated with the SA sounding packet 402. For example, each column of the feedback matrix V may correspond with a respective spatial stream SS1 or SS2. However, since the SA sounding packet 402 is transmitted only via the first spatial stream SS1, the component vector associated with the second spatial stream SS2 (e.g., the second column of the feedback matrix V) is not needed. Thus, to reduce overhead, the RX device 430 of FIG. 4A and/or the RX device 435 of FIG. 4B may transmit only the component vector associated with the first spatial stream SS1 (e.g., the first column of the feedback matrix V) to the TX device 410.

Figure 5:
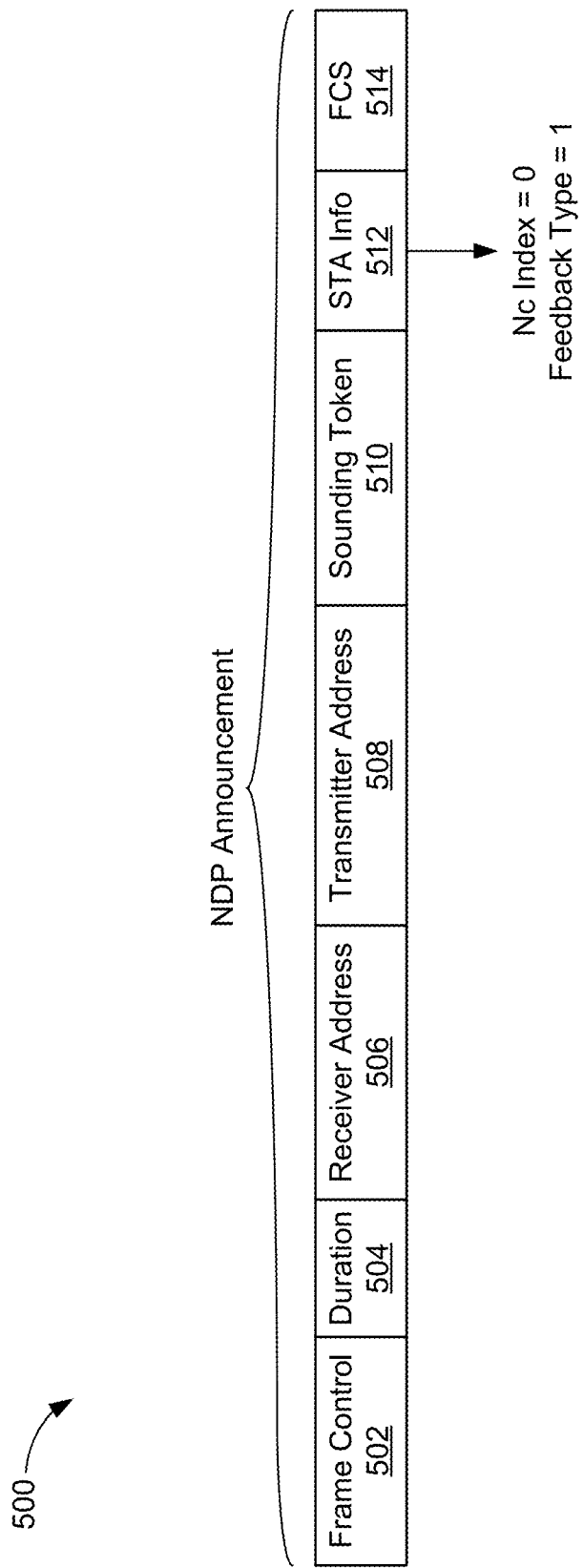
FIG. 5 shows an example structure of a null data packet (NDP) announcement frame in accordance with example embodiments.

For some embodiments, the TX device 410 may request only the first column of the feedback matrix V (e.g., corresponding with the first spatial stream SS1) from the RX device 430/435. For example, with reference to FIG. 5, the TX device 410 may transmit an NDP announcement message 500 to the RX device 430/435 prior to transmitting the SA sounding packet 402. The NDP announcement message 500 may be used to determine whether the following NDP is for multi-user (MU) or single-user (SU) sounding and/or to indicate the size of the feedback matrix V to be returned by the RX device 430/435 (e.g., by specifying the number of columns to be included in the feedback matrix V).

The NDP announcement message 500 may include a frame control field 502, a duration field 504, a receiver address field 506, a transmitter address field 508, a sounding token field 510, a station (STA) information field 512, and a frame check sequence (FCS) 514. The STA information field 512 includes a "Feedback Type" subfield that indicates the type of feedback requested. In example embodiments, the TX device may set the Feedback Type subfield to 1 to request MU feedback that contains Delta-SNR information. The STA information field 512 also includes an "Nc Index" subfield that describes the number of columns to be included in the feedback matrix V (e.g., each column corresponding to a respective spatial stream). In example embodiments, the TX device may set the Nc Index subfield to zero (e.g., Nc Index=0) to request only the first column of the feedback vector V and the associated Delta-SNR from the RX device 430/435. As a result, the RX device 430/435 may return only the component vector and Delta-SNR associated with the first spatial stream (e.g., even though the SA sounding packet 402 may specify at least two spatial streams).

Figure 6:
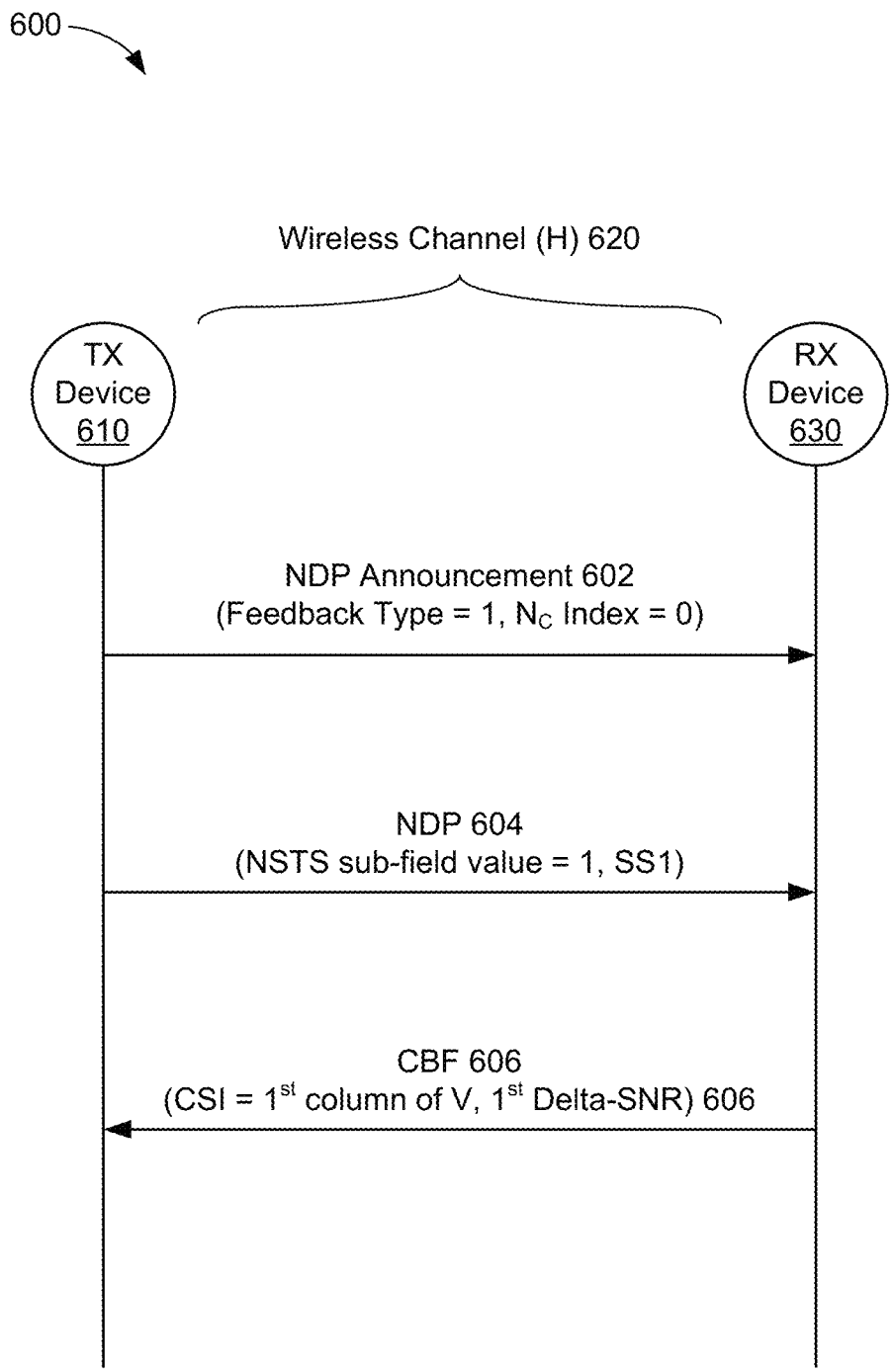
FIG. 6 is a sequence diagram depicting an example single-stream sounding operation in accordance with example embodiments.

FIG. 6 is a sequence diagram depicting an example single-stream sounding operation 600 between a TX device 610 and an RX device 630. The TX device 610 may be an embodiment of TX device 210 of FIG. 1 and/or TX device 410 of FIGS. 4A-4B. The RX device 630 may be an embodiment of RX device 230 and/or one of the RX devices 430/435 of FIGS. 4A-4B. The TX device 610 communicates with the RX device 630 via a wireless channel 620. More specifically, the TX device 610 may transmit wireless signals to the RX device 630 via a single spatial stream. Thus, for purposes of discussion herein, the wireless channel 620 may be a single-stream wireless channel.

The TX device 610 may initiate the single-stream sounding operation 600 by transmitting an NDP announcement message 602 to the RX device 630. In example embodiments, the NDP announcement message 602 may request a single-stream MU feedback to be returned by the RX device 630 based on the wireless channel 620. For example, the NDP announcement message 602 may be an embodiment of the NDP announcement message 500 of FIG. 5. Accordingly, the NDP announcement message 602 may include "Feedback Type" and "Nc Index" subfields (e.g., within the STA information field 512) specifying a single-stream feedback (e.g., Nc Index=0) in MU feedback format (e.g., Feedback Type=1).

The TX device 610 then transmits an NDP 604 (e.g., an SA sounding packet) to the RX device 630 to trigger a channel estimation by the RX device 630. In example embodiments, the NDP 604 may be transmitted in its entirety on a single spatial stream (e.g., on spatial stream SS1). However, the NDP 604 may be formatted for transmission via multiple (e.g., two) spatial streams. For example, the NDP 604 may be an embodiment of the SA sounding packet 300 of FIG. 3. Accordingly, the NDP 604 may include a "number of spatial streams" subfield (e.g., within the VHT-SIG-A$_1$ field 314) specifying at least two spatial streams (e.g., NSTS sub-field value=1). The NDP 604 may further include training data (e.g., provided with one or more VHT-LTF fields) that can be used by the RX device 630 to estimate the wireless channel 620.

The RX device 630 responds to the NDP 604 by transmitting a CBF 606 back to the TX device 610. The CBF 606 may include CSI for the wireless channel 620. More specifically, the RX device 630 may measure or otherwise estimate the wireless channel 620 based on the training data provided with the NDP 604, and may return information (e.g., eigen-vectors and/or eigen-values) based on the channel estimate $H_{est}$ to the TX device 610 via the CBF 606. As described above with respect to FIGS. 4A-4B, the NDP 604 may spoof or trick the RX device 630 into generating a multi-stream channel estimate $H_{est}$ for the wireless channel 620. For example, after SVD, the feedback matrix V associated with the channel estimate $H_{est}$ may be an N×2 matrix (e.g., assuming the NDP 604 is formatted for two spatial streams and the RX device 630 includes N receive antennas). However, for some embodiments, the RX device 630 may return only the first column of the feedback matrix V along with its associated Delta-SNR, as specified by the NDP announcement message 602, to the TX device 610.

In example embodiments, the TX device 610 may adjust a per-tone power loading of single-stream transmission to the RX device 630 based on the received CSI. For example, with reference to FIGS. 4A-4B, the Delta-SNR component of the CBF 606 may indicate a signal-to-noise ratio (SNR) of the wireless signals received by the RX device 630. More specifically, the Delta-SNR associated with the first column of the feedback matrix V may describe a per-tone SNR distribution of the first spatial stream (e.g., SS1) perceived at the RX device 630.

For example, the TX device 610 may determine the per-tone power distribution of the transmitted signals based on the following equation:

$$P(n) \approx \frac{\sqrt{P_{target}}}{\sqrt{(1-\beta)|S(n)|^2 + \frac{\beta}{N_T}\sum_{n=1}^{N_T}|S(n)|^2}}$$

where $|P(n)|^2$ represents the power weighting for each subcarrier index n, $P_{target}$ is the overall target power for the wireless signals, $N_T$ represents the total number of subcarriers or tones, $|S(n)|^2$ is the channel power (e.g., corresponding to the Delta-SNR) for each subcarrier index n, and $\beta$ is a normalization factor that may be used to adjust the dynamics of the power weighting.

The example embodiments recognize that having a very high SINR (e.g., above an upper threshold level) for a particular subcarrier may yield minimal performance gains for the overall wireless channel, whereas having a very low SINR (e.g., below a lower threshold level) may severely limit the performance of the overall wireless channel. Thus, for some embodiments, the TX device 610 may adjust or redistribute the overall power load of the transmitted signals by reducing the power loading of subcarriers with very high SINR (e.g., above the upper threshold level) and increasing the power loading of subcarriers with very low SINR (e.g., below the lower threshold level).

Figure 7:
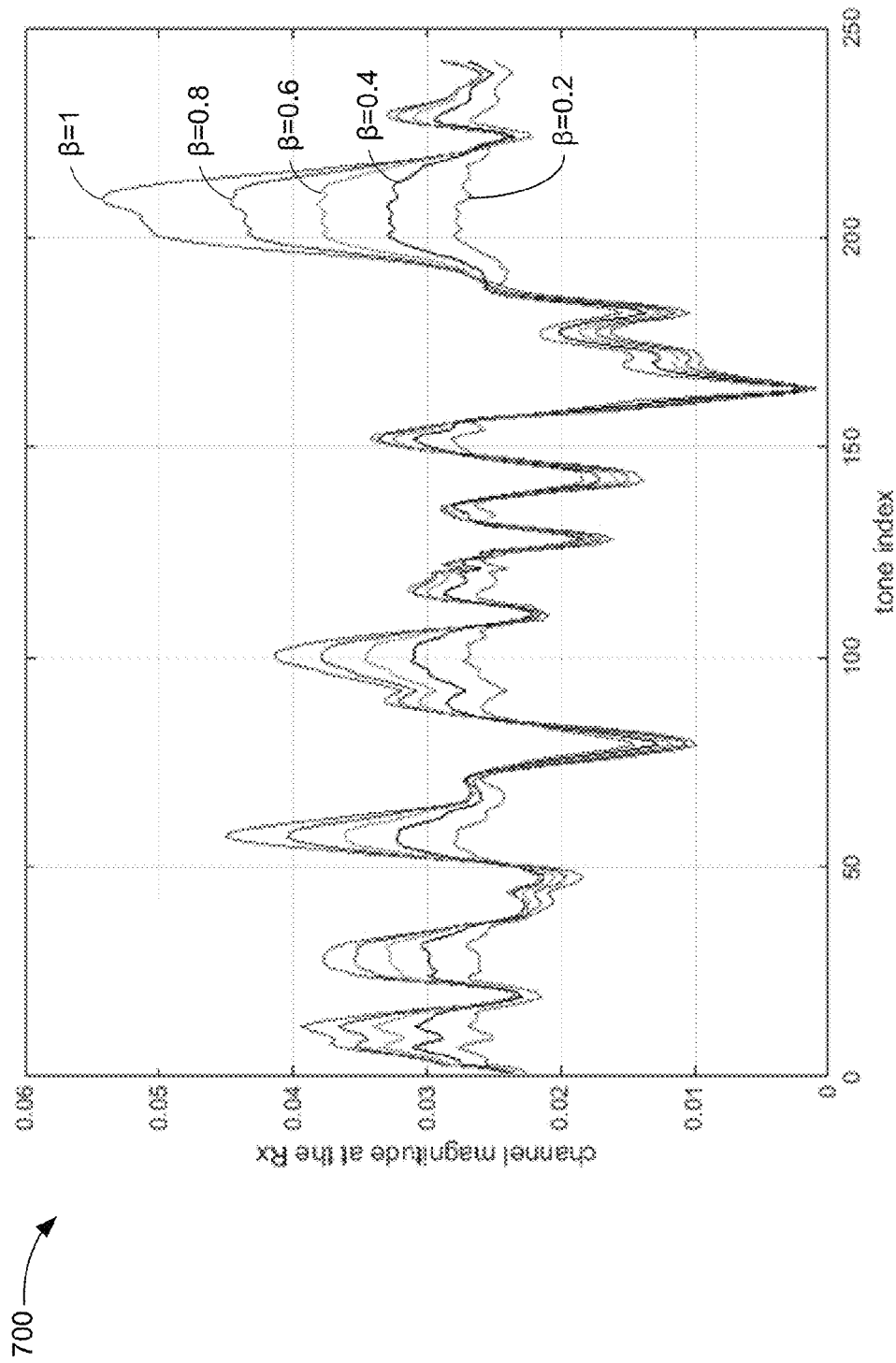
FIG. 7 is a graph depicting example per-tone power distributions for a single-stream wireless signal based on various normalization factors.

FIG. 7 is a graph 700 depicting example per-tone power distributions for a single-stream wireless signal based on various normalization factors. More specifically, the graph 700 maps the magnitude or power of the wireless channel perceived by an RX device (e.g., Delta-SNR) over a number of subcarriers or tones (e.g., each represented by a different tone index). A power curve may be determined (e.g., for different normalization factors $\beta$) based on the power weighting equation P(n) described above. For example, the power curve associated with the non-adjusted normalization factor (e.g., $\beta=1$) represents the current power distribution of the perceived wireless signals (e.g., as indicated by the channel estimate $H_{est}$) at RX side. The power curves associated with the adjusted normalization factors (e.g., $\beta=0.2$, $\beta=0.4$, $\beta=0.6$, and $\beta=0.8$) represent the power distribution of the perceived wireless signals for potential alternative power distribution schemes that may be used for transmitting the wireless signals.

In the example of FIG. 7, the non-adjusted power curve (e.g., $\beta=1$) exhibits relatively high per-tone power (e.g., above an upper threshold level, which may be relative to an average power of the wireless channel) for tones around 12, 25, 60, 100, and 212 (e.g., at the RX device). As described above, the additional power of such "over-powered" tones may provide little (if any) performance gain for the overall wireless channel. On the other hand, the non-adjusted power curve exhibits relatively low per-tone power (e.g., below a lower threshold level, which may be relative to the average power of the wireless channel) for tones around 80, 162, and 180 (e.g., at the RX device). As described, the reduced power of such "under-powered" tones may severely limit the performance of the overall wireless channel. Thus, for some embodiments, it may be desirable to redistribute or balance the overall power for the wireless channel by reducing the per-tone power loading of over-powered tones (e.g., tones around 12, 25, 60, 100, and 212) while increasing the per-tone power loading of under-powered tones (e.g., tones around 80, 162, and 180).

In example embodiments, the per-tone transmit power loading for the wireless channel may be adjusted based on the normalization factor $\beta$. For example, a smaller normalization factor $\beta$ may reduce the per-tone power loading for tones with relatively high receive power (e.g., corresponding to the peaks of the power curve) while increasing the per-tone power loading for tones with relatively low receive power (e.g., corresponding to the troughs of the power curve). However, a smaller normalization factor $\beta$ may also result in an overall reduction in receive power. Thus, an optimal per-tone power loading scheme maybe achieved by determining a normalization factor $\beta$ that reduces the per-tone power for tones with excess power (e.g., tones around 12, 25, 60, 100, and 212) and increases the per-tone power for tones that are underpowered (e.g., tones around 80, 162, and 180), without excessively flattening the overall channel. In the example of FIG. 7, the optimal per-tone power loading scheme may correspond to a normalization factor $\beta$ of approximately 0.5 (e.g., $\beta=0.5$).

Figure 8:
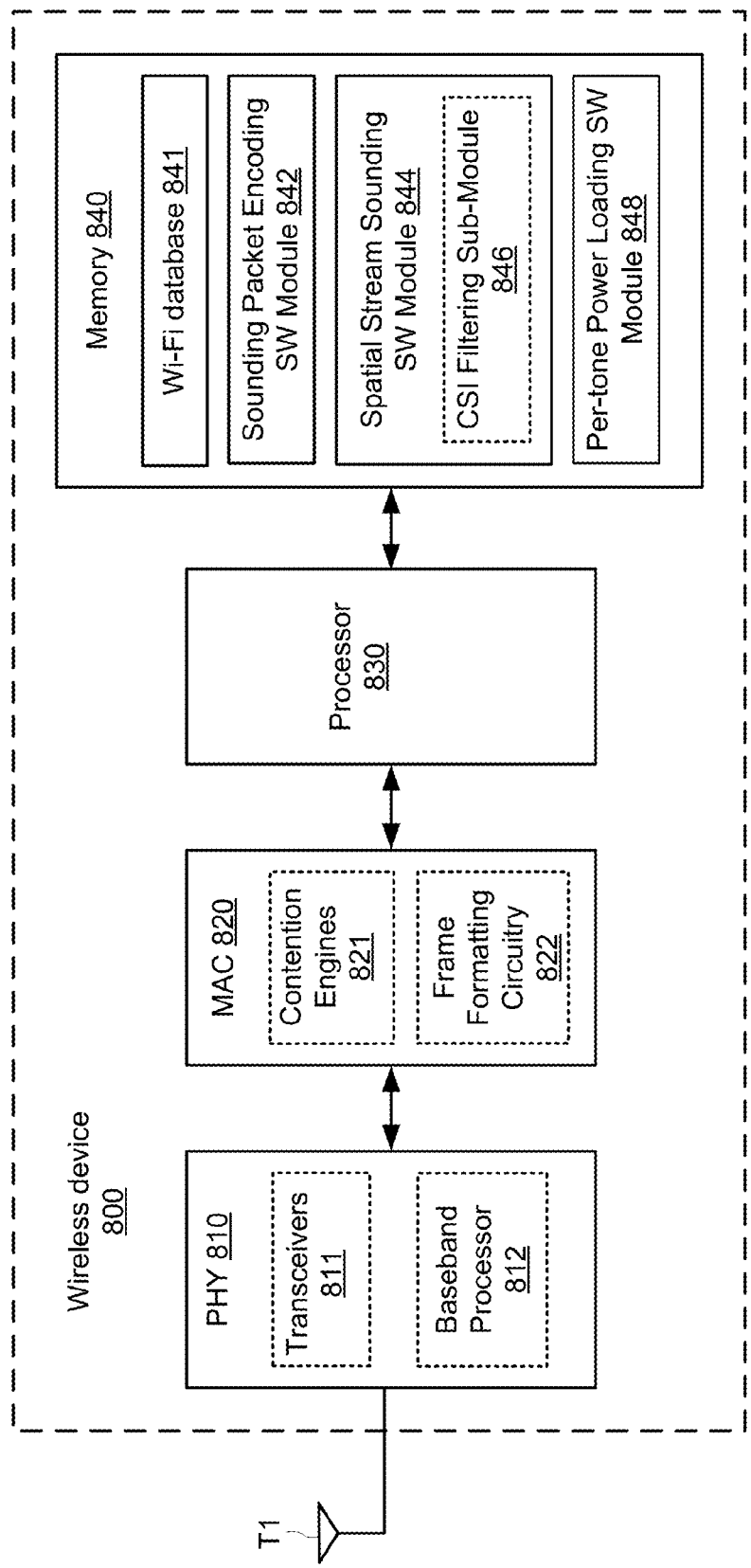
FIG. 8 shows a block diagram of a TX device in accordance with example embodiments.

FIG. 8 shows a block diagram of a wireless device 800 in accordance with example embodiments. The wireless device 800 may be one embodiment of TX device 210 of FIG. 2 and/or TX device 410 of FIGS. 4A-4B. The wireless device 800 may include a PHY device 810 including at least a number of transceivers 811 and a baseband processor 812, may include a MAC 820 including at least a number of contention engines 821 and frame formatting circuitry 822, may include a processor 830, may include a memory 840, and may include an antenna T1. Although wireless device 800 is depicted in FIG. 8 as including only one antenna T1, for other embodiments, wireless device 800 may include any suitable number of antennas.

The transceivers 811 may be coupled to antenna T1, either directly or through an antenna selection circuit (not shown for simplicity). The transceivers 811 may be used to transmit signals to and receive signals from other wireless devices, and may be used to scan the surrounding environment to detect and identify nearby access points and other wireless devices (e.g., within wireless range of wireless device 800). Although not shown in FIG. 8 for simplicity, the transceivers 811 may include any number of transmit chains to process and transmit signals to other wireless devices, and may include any number of receive chains.

The baseband processor 812 may be used to process signals received from processor 830 and/or memory 840 and to forward the processed signals to transceivers 811 for transmission via antenna T1, and may be used to process signals received from antenna T1 via transceivers 811 and to forward the processed signals to processor 830 and/or memory 840.

For purposes of discussion herein, MAC 820 is shown in FIG. 8 as being coupled between PHY device 810 and processor 830. For actual embodiments, PHY device 810, MAC 820, processor 830, and/or memory 840 may be connected together using one or more buses (not shown for simplicity).

The contention engines 821 may contend for access to one or more shared wireless mediums, and may also store packets for transmission over the one or more shared wireless mediums. For other embodiments, the contention engines 821 may be separate from MAC 820. For still other embodiments, the contention engines 821 may be implemented as one or more software modules (e.g., stored in memory 840 or stored in memory provided within MAC 820) containing instructions that, when executed by processor 830, perform the functions of contention engines 821.

The frame formatting circuitry 822 may be used to create and/or format frames received from processor 830 and/or memory 840 (e.g., by adding MAC headers to PDUs provided by processor 830), and may be used to re-format frames received from PHY device 810 (e.g., by stripping MAC headers from frames received from PHY device 810).

Memory 840 may include a Wi-Fi database 841 that may store location data, configuration information, data rates, MAC addresses, and other suitable information about (or pertaining to) a number of access points, stations, and/or other wireless devices. The Wi-Fi database 841 may also store profile information for a number of wireless devices. The profile information for a given wireless device may include information including, for example, the wireless device's service set identification (SSID), channel information, received signal strength indicator (RSSI) values, goodput values, channel state information (CSI), and connection history with wireless device 800.

Memory 840 may also include a non-transitory computer-readable medium (e.g., one or more nonvolatile memory elements, such as EPROM, EEPROM, Flash memory, a hard drive, etc.) that may store at least the following software (SW) modules:
 a sounding packet encoding SW module 842 to generate an SA sounding packet formatted for transmission via multiple spatial streams;
 a spatial stream sounding SW module 844 to acquire CSI for a single-stream wireless channel;
 a CSI filtering SW sub-module 846 to determine the CSI for the single-stream wireless channel based at least in part on a multi-stream channel estimate; and
 a per-tone (PT) power loading SW module 848 to adjust a per-tone power loading of wireless signals transmitted via the single-stream wireless channel.

Each software module includes instructions that, when executed by processor 830, causes the wireless device 800 to perform the corresponding functions. The non-transitory computer-readable medium of memory 840 thus includes instructions for performing all or a portion of the operations described below with respect to FIGS. 9 and 10.

Processor 830 may be any suitable one or more processors capable of executing scripts or instructions of one or more software programs stored in the wireless device 800 (e.g., within memory 840). For example, processor 830 may execute the sounding packet encoding SW module 842 to generate an SA sounding packet formatted for transmission via multiple spatial streams. Processor 830 may execute the spatial stream sounding SW module 844 to acquire CSI for a single-stream wireless channel. In executing the spatial stream sounding SW module 844, the processor 830 may further execute the CSI filtering SW sub-module 846 to determine the CSI for the single-stream wireless channel based at least in part on a multi-stream channel estimate. The processor 830 may execute the PT power loading SW module 848 to adjust a per-tone power loading of wireless signals transmitted via the single-stream wireless channel.

Figure 9:
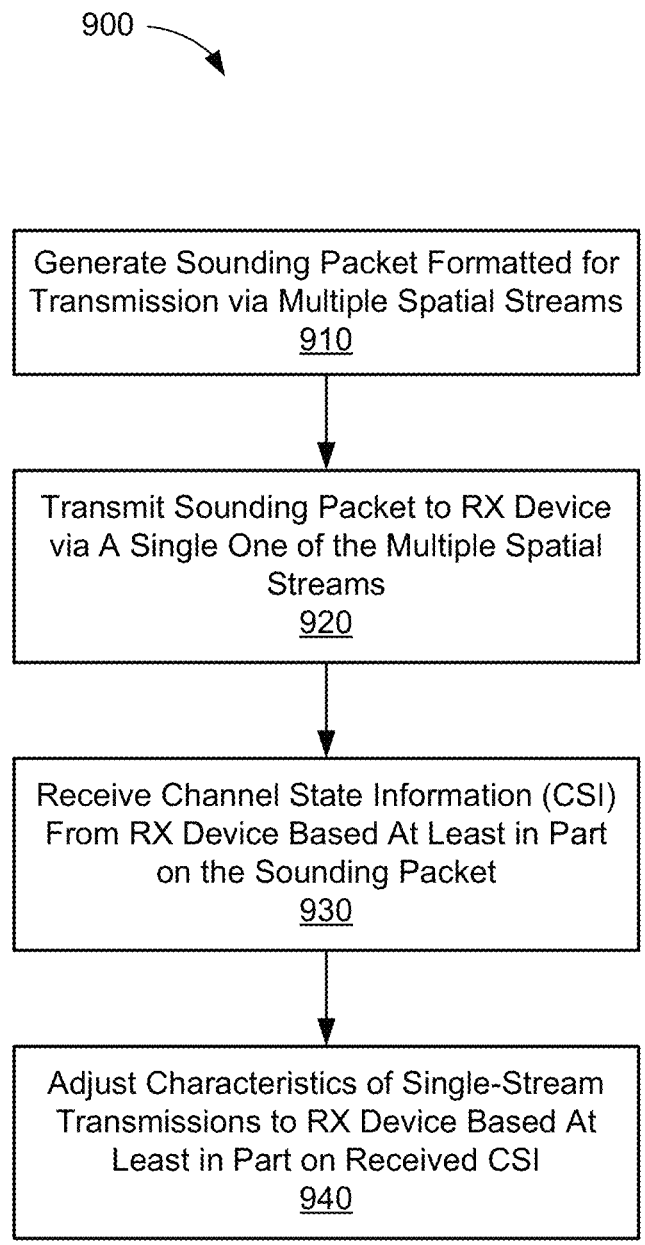
FIG. 9 is an illustrative flowchart depicting an example operation for adjusting one or more characteristics of single-stream transmissions by a TX device based on CSI acquired from an RX device.

FIG. 9 is an illustrative flowchart depicting an example operation 900 for adjusting one or more characteristics of single-stream transmissions by a TX device based on CSI acquired from an RX device, in accordance with example embodiments. With reference for example to FIG. 8, the operation 900 may be implemented by the wireless device 800 to improve the quality and/or efficiency of single-stream communications with an RX device.

The wireless device 800 may first generate a sounding packet formatted for transmission via multiple spatial streams (910). In example embodiments, the processor 830, in executing the sounding packet encoding SW module 842, may generate an SA sounding packet that is formatted in accordance with one or more well-known or existing beamforming techniques (e.g., as defined by the IEEE 802.11ac standards). For example, with reference to FIG. 3, the SA sounding packet 300 may specify two or more spatial streams in the VHT-SIG-A$_1$ field 314 (e.g., NSTS subfield value ≥1). The SA sounding packet 300 may include training data (e.g., provided in one or more VHT-LTF fields) that can be used by the RX device to measure or otherwise estimate a corresponding single-stream wireless channel.

The wireless device 800 transmits the sounding packet to the RX device via a single one of the multiple spatial streams (920). For example, with reference to FIG. 3, only one of the spatial stream components 310 or 320 may be transmitted (e.g., via the single spatial stream) as the SA sounding packet 300. For some embodiments, the processor 830, in executing the spatial stream sounding SW module 844, may generate both spatial stream components 310 and 320 of the SA sounding packet 300 (e.g., using conventional VHT NDP generation techniques) and transmit only the first spatial stream component 310 to the RX device. In other embodiments, the processor 830, in executing the spatial stream sounding SW module 844, may generate only the first spatial stream component 310 of the SA sounding packet 300.

The wireless device 800 may receive, from the RX device, CSI based at least in part on the sounding packet (930). For example, the SA sounding packet may spoof or trick the RX device into thinking it is receiving a multi-stream sounding packet (e.g., a VHT NDP) from the wireless device 800 in accordance with known or existing beamforming protocols. Accordingly, the RX device may generate and feedback CSI to the wireless device 800 based on the training data provided with the SA sounding packet. For example, the CSI may be in the compressed format of a channel estimate $H_{est}$. Because the SA sounding packet is transmitted entirely on a single spatial stream, the channel estimate $H_{est}$ generated by the RX device may clearly indicate the channel properties of a corresponding single-stream wireless channel.

In some aspects, the CSI received from the RX device may include component estimates for a multi-stream channel (e.g., for each of multiple spatial streams). Thus, for some embodiments, the processor 830, in executing the CSI filtering SW sub-module 846, may identify the portion of the received CSI that directly corresponds to the single-stream channel. In other aspects, the CSI received from the RX device may include only the component estimate for the single-stream channel. Thus, for some embodiments, the processor 830, in executing the CSI filtering SW sub-module 846, may request that the RX device feeds back only the vector component of a feedback matrix V and the corresponding Delta-SNR (e.g., based on the channel estimate $H_{est}$) that represents the single-stream channel. For example, with reference to FIG. 5, the wireless device 800 may specify the request by setting the Nc Index subfield (e.g., within the STA information field 512) of NDP announcement message 500 to zero. It may also specify the request by setting the Feedback Type subfield (e.g., within the STA information field 512) of the NDP announcement message 500 to one.

Finally, the wireless device 800 may adjust one or more characteristics of single-stream transmissions to the RX device based at least in part on the received CSI (940). For example, the Delta-SNR of the channel estimate $H_{est}$ may reflect a per-tone channel power of wireless signals received at the RX device. In example embodiments, the processor 830 may execute the PT power loading SW module 848 to redistribute and/or balance the overall power of the transmitted signals based on the Delta-SNR of the channel estimate $H_{est}$.

Figure 10:
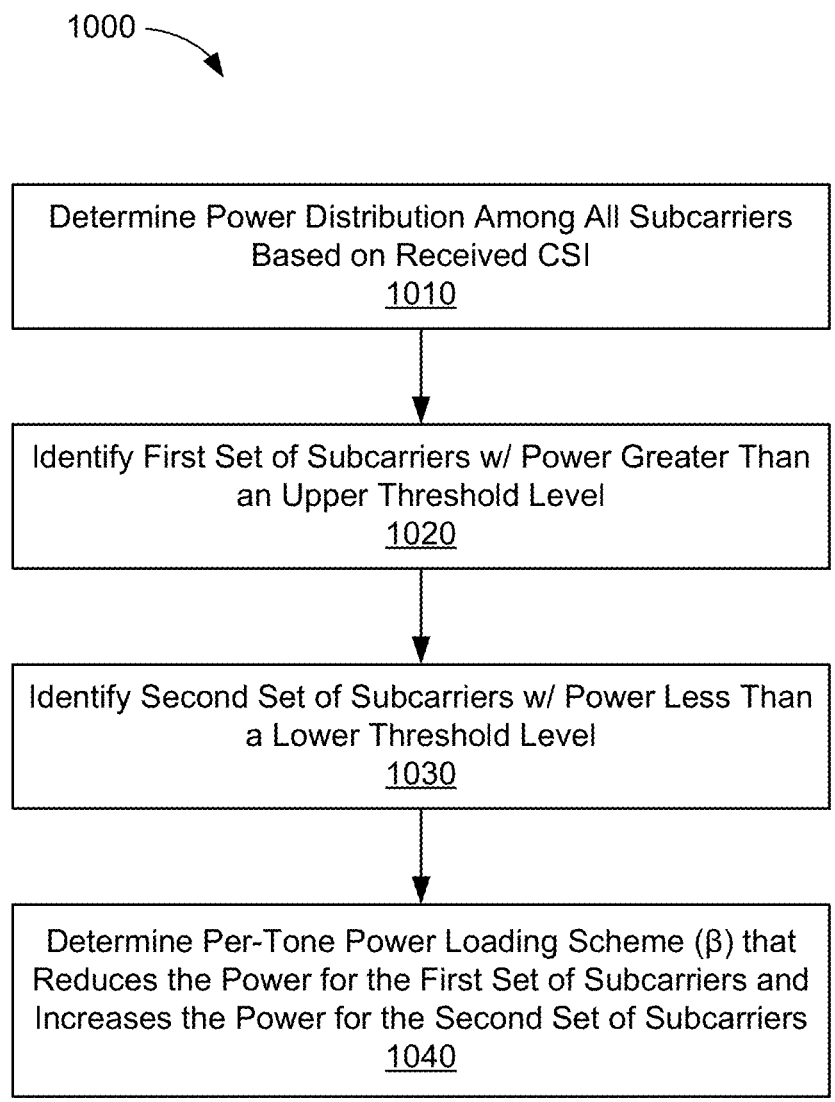
FIG. 10 is an illustrative flowchart depicting an example operation for redistributing a transmit power load among multiple subcarriers.

FIG. 10 is an illustrative flowchart depicting an example operation 1000 for redistributing a transmit power load among multiple subcarriers in accordance with example embodiments. With reference for example to FIG. 8, the operation 1000 may be implemented by the wireless device 800 to adjust a per-tone power loading of individual subcarriers that are used to transmit data to an RX device.

The wireless device 800 may first determine a power distribution among all of the subcarriers (e.g., $|S(n)|^2$) based on CSI received from the RX device (1010). In example embodiments, the processor 830, in executing the PT power loading SW module 848, may then use the power weighting equation P(n) to map $|S(n)|^2$ (e.g., corresponding to the Delta-SNR of a received channel estimate $H_{est}$) to a per-tone power scaler $|P(n)|^2$ over a number of subcarriers or tones.

In example embodiments, the wireless device 800 may identify a first set of subcarriers with power greater than an upper threshold level (1020). For example, the upper threshold level may be relative to an average power of the perceived RX power (e.g., average of $|S(n)|^2$ across tones). More specifically, having any per-tone power in excess of the upper threshold level may provide little (if any) performance gain for the overall wireless channel. With reference for example to FIG. 7, the first set of subcarriers (e.g., over-powered tones) may correspond with one or more peaks of an RX power curve for the wireless channel.

The wireless device 800 may further identify a second set of subcarriers with power less than a lower threshold level (1030). For example, the lower threshold level may also be relative to an average power of the perceived RX power (e.g., average of $|S(n)|^2$ across tones). More specifically, having any per-tone power less than the lower threshold level may severely limit the performance of the overall wireless channel. With reference for example to FIG. 7, the second set of subcarriers (e.g., under-powered tones) may correspond with one or more troughs of the RX power curve for the wireless channel.

Finally, the wireless device 800 may determine a per-tone power loading scheme (e.g., based on the normalization factor β) that reduces the power for the first set of subcarriers and increases the power for the second set of subcarriers (1040). For example, a smaller normalization factor β may reduce the per-tone power loading for tones with relatively high transmit power while increasing the per-tone power loading for tones with relatively low transmit power. However, a smaller normalization factor β may also result in an overall reduction in receive power. In example embodiments, the processor 830, in executing the PT power loading SW module 848, may determine a normalization factor β that optimizes the per-tone power loading of the individual subcarriers. For example, the optimal per-tone power loading scheme may result in the highest quality and/or efficiency of the overall wireless channel.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of operating a wireless device, the method comprising:
   generating a sounding packet formatted for transmission via multiple spatial streams;
   transmitting the sounding packet to a receiving device via a single one of the multiple spatial streams;
   receiving, from the receiving device, channel state information (CSI) based at least in part on the sounding packet; and
   adjusting one or more characteristics of single-stream transmissions to the receiving device based at least in part on the received CSI.

2. The method of claim 1, wherein the wireless device is a single-antenna device.

3. The method of claim 1, wherein the sounding packet is formatted in accordance with an IEEE 802.11 beamforming protocol.

4. The method of claim 1, wherein the sounding packet is a very high throughput (VHT) null data packet (NDP), and wherein a Signal A field of the VHT NDP indicates two or more spatial streams.

5. The method of claim 1, wherein the received CSI corresponds with a single column of a feedback matrix generated by the receiving device in response to the sounding packet.

6. The method of claim 5, further comprising:
   requesting, from the receiving device, only the single column of the feedback matrix that corresponds with the single spatial stream.

7. The method of claim 1, wherein the adjusting comprises:
   redistributing a power load for the single-stream transmissions on a per-tone power loading basis.

8. The method of claim 7, wherein the redistributing comprises:

identifying one or more subcarriers having a signal-to-interference-plus-noise ratio (SINR) above a threshold level based on the received CSI; and
reducing the per-tone power loading of the one or more identified subcarriers.

9. The method of claim 7, wherein the redistributing comprises:
identifying one or more subcarriers having a signal-to-interference-plus-noise ratio (SINR) below a threshold level based on the received CSI; and
increasing the per-tone power loading of the one or more identified subcarriers.

10. A wireless device, comprising:
one or more processors; and
a memory storing instructions that, when executed by the one or more processors, cause the wireless device to:
generate a sounding packet formatted for transmission via multiple spatial streams;
transmit the sounding packet to a receiving device via a single one of the multiple spatial streams;
receive, from the receiving device, channel state information (CSI) based at least in part on the sounding packet; and
adjust one or more characteristics of single-stream transmissions to the receiving device based at least in part on the received CSI.

11. The wireless device of claim 10, wherein the wireless device is a single-antenna device.

12. The wireless device of claim 10, wherein the sounding packet is formatted in accordance with an IEEE 802.11 beamforming protocol.

13. The wireless device of claim 10, wherein the sounding packet is a very high throughput (VHT) null data packet (NDP), and wherein a Signal A field of the VHT NDP indicates two or more spatial streams.

14. The wireless device of claim 10, wherein the received CSI corresponds with a single column of a feedback matrix generated by the receiving device in response to the sounding packet.

15. The wireless device of claim 14, wherein execution of the instructions further causes the wireless device to:
request, from the receiving device, only the single column of the feedback matrix that corresponds with the single spatial stream.

16. The wireless device of claim 10, wherein execution of the instructions further causes the wireless device to:
redistribute a power load for the single-stream transmissions on a per-tone power loading basis.

17. The wireless device of claim 16, wherein execution of the instructions to redistribute the power load causes the wireless device to:
identify one or more subcarriers having a signal-to-interference-plus-noise ratio (SINR) above a threshold level based on the received CSI; and
reduce the per-tone power loading of the one or more identified subcarriers.

18. The wireless device of claim 16, wherein execution of the instructions to redistribute the power load causes the wireless device to:
identify one or more subcarriers having a signal-to-interference-plus-noise ratio (SINR) below a threshold level based on the received CSI; and
increase the per-tone power loading of the one or more identified subcarriers.

19. A wireless device, comprising:
means for generating a sounding packet formatted for transmission via multiple spatial streams;
means for transmitting the sounding packet to a receiving device via a single one of the multiple spatial streams;
means for receiving, from the receiving device, channel state information (CSI) based at least in part on the sounding packet; and
means for adjusting one or more characteristics of single-stream transmissions to the receiving device based at least in part on the received CSI.

20. The wireless device of claim 19, wherein the sounding packet is a very high throughput (VHT) null data packet (NDP), and wherein a Signal A field of the VHT NDP indicates two or more spatial streams.

21. The wireless device of claim 19, wherein the received CSI corresponds with a single column of a feedback matrix generated by the receiving device in response to the sounding packet.

22. The wireless device of claim 21, further comprising:
means for requesting, from the receiving device, only the single column of the feedback matrix that corresponds with the single spatial stream.

23. The wireless device of claim 19, further comprising means for redistributing a power load for the single-stream transmissions on a per-tone power loading basis, wherein the means for redistributing is to:
identify one or more subcarriers having a signal-to-interference-plus-noise ratio (SINR) above a threshold level based on the received CSI; and
reduce a per-tone power loading of the one or more identified subcarriers.

24. The wireless device of claim 19, further comprising means for redistributing a power load for the single-stream transmissions on a per-tone power loading basis, wherein the means for redistributing is to:
identify one or more subcarriers having a signal-to-interference-plus-noise ratio (SINR) below a threshold level based on the received CSI; and
increase a per-tone power loading of the one or more identified subcarriers.

25. A non-transitory computer-readable medium storing instructions that, when executed by one or more processors of a wireless device, cause the wireless device to:
generate a sounding packet formatted for transmission via multiple spatial streams;
transmit the sounding packet to a receiving device via a single one of the multiple spatial streams;
receive, from the receiving device, channel state information (CSI) based at least in part on the sounding packet; and
adjust one or more characteristics of single-stream transmissions to the receiving device based at least in part on the received CSI.

26. The non-transitory computer-readable medium of claim 25, wherein the sounding packet is a very high throughput (VHT) null data packet (NDP), and wherein a Signal A field of the NDP indicates two or more spatial streams.

27. The non-transitory computer-readable medium of claim 25, wherein the received CSI corresponds with a single column of a feedback matrix generated by the receiving device in response to the sounding packet.

28. The non-transitory computer-readable medium of claim 27, wherein execution of the instructions further causes the wireless device to:
request, from the receiving device, only the single column of the feedback matrix that corresponds with the single spatial stream.

29. The non-transitory computer-readable medium of claim 25, wherein execution of the instructions further causes the wireless device to redistribute a power load for the single-stream transmissions on a per-tone power loading basis, and wherein execution of the instructions to redistribute the power load causes the wireless device to:
- identify one or more subcarriers having a signal-to-interference-plus-noise ratio (SINR) above a threshold level based on the received CSI; and
- reduce a per-tone power loading of the one or more identified subcarriers.

30. The non-transitory computer-readable medium of claim 25, wherein execution of the instructions further causes the wireless device to redistribute a power load for the single-stream transmissions on a per-tone power loading basis, and wherein execution of the instructions to redistribute the power load causes the wireless device to:
- identify one or more subcarriers having a signal-to-interference-plus-noise ratio (SINR) below a threshold level based on the received CSI; and
- increase a per-tone power loading of the one or more identified subcarriers.

* * * * *